US010027612B2

(12) United States Patent
Shaw

(10) Patent No.: US 10,027,612 B2
(45) Date of Patent: Jul. 17, 2018

(54) METHOD AND APPARATUS FOR MANAGING CONTENT DISTRIBUTION ACCORDING TO SOCIAL NETWORKS

(71) Applicant: AT&T INTELLECTUAL PROPERTY I, LP, Atlanta, GA (US)

(72) Inventor: Venson Shaw, Kirkland, WA (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 260 days.

(21) Appl. No.: 14/949,356

(22) Filed: Nov. 23, 2015

(65) Prior Publication Data
US 2017/0149711 A1    May 25, 2017

(51) Int. Cl.
| | | |
|---|---|---|
| *G06F 15/16* | (2006.01) | |
| *H04L 12/58* | (2006.01) | |
| *H04L 29/06* | (2006.01) | |
| *H04L 12/24* | (2006.01) | |
| *H04L 29/08* | (2006.01) | |
| *G06Q 30/02* | (2012.01) | |
| *G06Q 50/00* | (2012.01) | |

(52) U.S. Cl.
CPC ......... *H04L 51/12* (2013.01); *G06Q 30/0269* (2013.01); *G06Q 50/01* (2013.01); *H04L 41/0893* (2013.01); *H04L 65/4076* (2013.01); *H04L 67/22* (2013.01); *H04L 67/306* (2013.01)

(58) Field of Classification Search
USPC ....................................................... 709/205
See application file for complete search history.

(56) References Cited

U.S. PATENT DOCUMENTS

| | | |
|---|---|---|
| 8,386,304 B2 | 2/2013 | Chen et al. |
| 8,782,135 B2 | 7/2014 | Roman et al. |
| 8,886,836 B2 | 11/2014 | Luu |
| 9,106,964 B2 | 8/2015 | Zhao |
| 9,110,929 B2 | 8/2015 | Garcia et al. |
| 9,118,731 B2 | 8/2015 | Bennett et al. |

(Continued)

FOREIGN PATENT DOCUMENTS

WO      2015148693      1/2015

OTHER PUBLICATIONS

"Dynamic, Personalized Ads On All Screens", Jivox.com, Oct. 2015.

(Continued)

*Primary Examiner* — Hee Soo Kim
(74) *Attorney, Agent, or Firm* — Guntin & Gust, PLC; Atanu Das

(57) ABSTRACT

Aspects of the subject disclosure may include, for example, determining a common interests associated with a group of users according to activity information obtained for the group of users, providing a first media service during the consuming of the media content to first equipment of a remainder of the group of users where the first media service is selected according to a first common interest, and providing one of the first media service or a second media service during the consuming of the media content to second equipment of a subset of the group of users according to a conflict resolution, where the second media service is selected according to the second common interest, and where the conflict resolution is based on determining a stronger interest, between the first and second common interests, that is associated with each member of the subset of the group of users. Other embodiments are disclosed.

20 Claims, 6 Drawing Sheets

(56) References Cited

U.S. PATENT DOCUMENTS

| | | |
|---|---|---|
| 9,138,652 B1 | 9/2015 | Thompson et al. |
| 2010/0131385 A1 | 5/2010 | Harrang et al. |
| 2010/0185507 A1 | 7/2010 | Tokuda et al. |
| 2011/0153414 A1 | 6/2011 | Elvekrog et al. |
| 2011/0197237 A1 | 8/2011 | Turner et al. |
| 2012/0047529 A1 | 2/2012 | Schultz et al. |
| 2012/0284093 A1 | 11/2012 | Evans et al. |
| 2013/0091246 A1 | 4/2013 | Urbanski et al. |
| 2013/0132200 A1 | 5/2013 | Grace et al. |
| 2013/0218942 A1 | 8/2013 | Willis et al. |
| 2013/0325601 A1 | 12/2013 | Shekhawat et al. |
| 2014/0067950 A1 | 3/2014 | Winograd et al. |
| 2014/0195675 A1 | 7/2014 | Silver et al. |
| 2014/0282779 A1 | 9/2014 | Navarro et al. |
| 2015/0026721 A1 | 1/2015 | Feng et al. |
| 2015/0088635 A1 | 3/2015 | Maycotte et al. |
| 2015/0121432 A1 | 4/2015 | Pandey |
| 2015/0193516 A1 | 7/2015 | Harb |
| 2015/0201240 A1 | 7/2015 | Hamano et al. |

OTHER PUBLICATIONS

Acharya, S., "Hitting the Target with Television Advertising", Alcatel-Lucent, Jun. 15, 2008.
Fixmer, Andy et al., "DirectTV Upends Ad Model With Toyota Spots for Auto Geeks", bloomberg.com, Sep. 23, 2013.
Steinberg, Brian, "How Television Advertising Will Change", Business Insider, Nov. 30, 2009.

100

METHOD AND APPARATUS FOR MANAGING CONTENT DISTRIBUTION ACCORDING TO SOCIAL NETWORKS

FIELD OF THE DISCLOSURE

The subject disclosure relates to a method and apparatus for managing content distribution according to social networks.

BACKGROUND

As technology improves, the available options for communication services to users increases. Selection of content for presentation to the users including movies, programming, advertising and the like is often performed based on generalizations associated with demographics, such as age and gender. However, not all users fit those generalizations which can lead to selection of content which is not of interest to a particular user.

BRIEF DESCRIPTION OF THE DRAWINGS

Reference will now be made to the accompanying drawings, which are not necessarily drawn to scale, and wherein.

DETAILED DESCRIPTION

Figure 1:
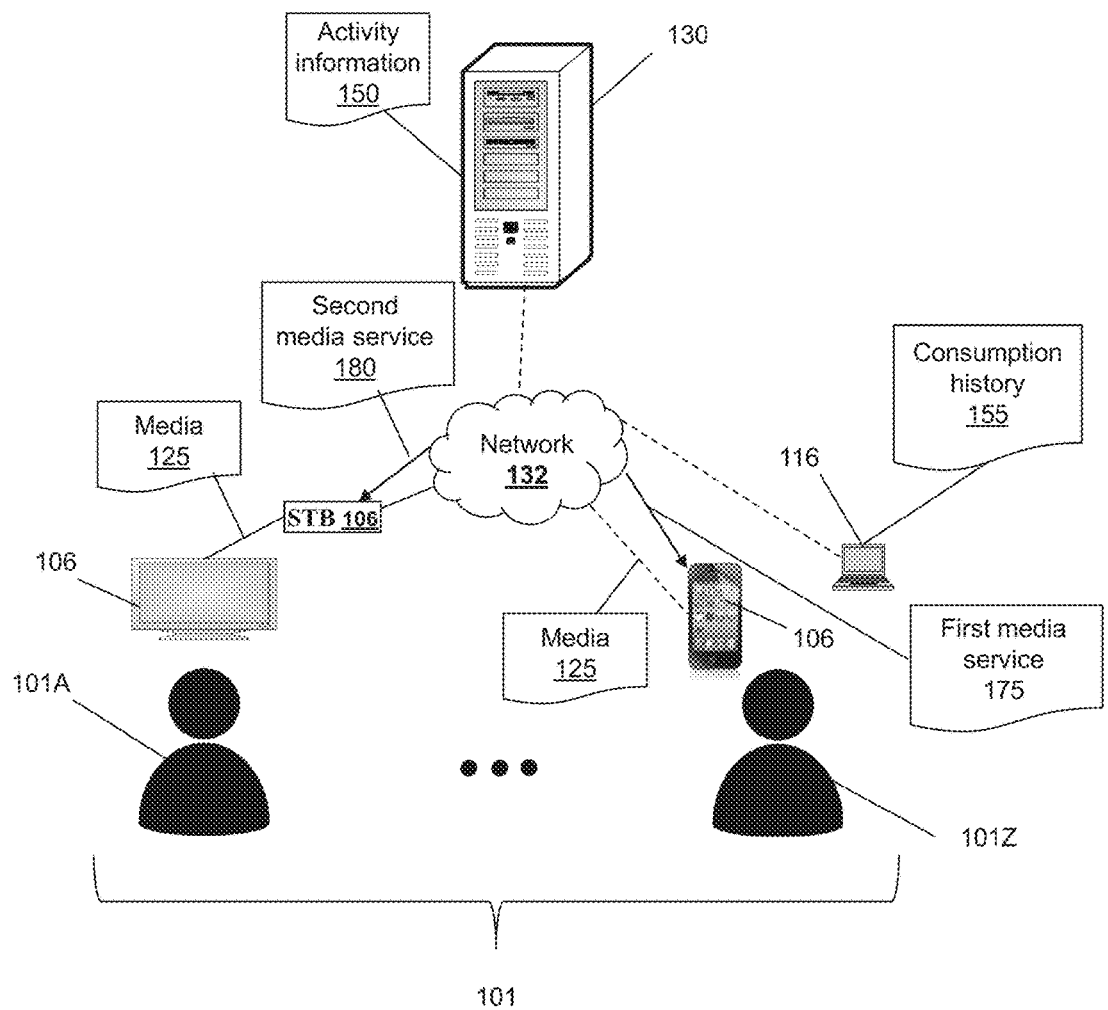
FIGS. 1 and 2 depict illustrative embodiments of systems that categorize users and provide media services to those users according to common interests.

The subject disclosure describes, among other things, illustrative embodiments for socially categorizing different users and providing services according to those categories. The different users can be consuming a same or different content. Different services and/or content can be provided (e.g., in addition to the presentation of the content) based on social network group(s) that are assigned to the different users.

In one embodiment, a system can categorize users (e.g., dynamically during a broadcast of particular content) into different social network groups (where the users may or may not know each other); provide additional media services within the dynamic social network group; and/or provide targeted advertising to each of the different social network groups. For example during a presentation of a sporting event, a first group of users can be determined to be fans of a particular player according to consumption history. The first group can be provided with access to a chat window (e.g., shown on each television of each user of the first group along with the sporting event) where other users outside of the first group do not see the chat window.

In another embodiment, conflict resolution can be applied for selecting the media service and/or targeted advertising where a user is determined to be part of more than one social network group. For example, during a presentation of a sporting event user A can be determined to be part of group 1 which is a social network of users that go daily to the gym and also part of group 2 which is a social network of users that go out to a sports bar after playing softball. Conflict resolution can be applied to determine whether a commercial for a health bar (intended for group 1) or a commercial for beer (intended for group 2) is to be delivered to a set top box of user A. The conflict resolution can be based on various factors including content consumption history of user A. Other embodiments are described in the subject disclosure.

One or more aspects of the subject disclosure is a method that includes obtaining, by a system including a server, activity information for each of a group of users at different locations consuming media content. The method includes determining, by the system, a first social category associated with the group of users according to the activity information. The method includes determining, by the system, a first common interest associated with the first social category. The method includes determining, by the system, a second social category associated with a subset of the group of users according to the activity information, where the second social category is not associated with a remainder of the group of users. The method includes determining, by the system, a second common interest associated with the second social category. The method includes providing, by the system, a first media service during the consuming of the media content to first equipment of the remainder of the group of users, where the first media service is selected according to the first common interest and according to the media content being consumed. The method includes determining, by the system, a conflict resolution by determining a stronger interest, between the first and second common interests, that is associated with each member of the subset of the group of users. The method includes providing, by the system, one of the first media service or a second media service during the consuming of the media content to second equipment of the subset of the group of users according to the conflict resolution, where the second media service is selected according to the second common interest and according to the media content being consumed.

One or more aspects of the subject disclosure include a machine-readable storage medium, comprising executable instructions that, when executed by a processor, facilitate performance of operations, including determining a first common interest associated with a group of users according to activity information obtained for the group of users, where the group of users are at different locations and are consuming media content. The processor can determine a second common interest associated with a subset of the group of users according to the activity information, where the second common interest is not associated with a remainder of the group of users. The processor can provide a first media service during the consuming of the media content to first equipment of the remainder of the group of users, wherein the first media service is selected according to the first common interest. The processor can provide one of the first media service or a second media service during the consuming of the media content to second equipment of the subset of the group of users according to a conflict resolution, where the second media service is selected according to the second common interest, and where the conflict resolution is based on determining a stronger interest, between the first and second common interests, that is associated with each member of the subset of the group of users.

One or more aspects of the subject disclosure include a device having a processor and a memory that stores executable instructions that, when executed by the processor, facilitate performance of operations, including receiving, from a system including a server, media content. The processor can present the media content at a display device associated with a user. The processor can receive, from the system, a targeted advertisement that has been selected by the system from among a group of advertisements according to: a first common interest of a first social category assigned by the system to a group of users including the user that are consuming the media content, a second common interest of a second social category assigned by the system to a subset of the group of users that includes the user and that is not associated with a remainder of the group of users, and a conflict resolution applied by the system by determining a stronger interest of the user between the first and second common interests. The processor can detect an insertion point in the media content. The processor can present the targeted advertisement at the insertion point.

FIG. 1 depicts an illustrative embodiment of a system 100 that delivers communication or media services over network 132 to media devices 106 that are associated with a group of users 101, who can be located at different locations, such as at different premises. The media devices 106 can be various types of devices including set top boxes, televisions, desktop computers, laptop computers, mobile phones, vehicle communication systems, or any other type of communication device that provides communication services to users. The communication or media services can be various types of services including voice, video, audio, data and/or messaging services. The network can utilize various components and techniques for delivering the communication or media services, including wireless and/or wired communication protocols.

In one embodiment, a server 130 can determine the group of users 101 that are consuming or otherwise being presented media content 125 (which can be the same media content such as a television program, a movie, a sporting event, and so forth). The server 130 can access or otherwise receive consumption information indicating a channel presently being tuned to or the media content 125 currently being presented. For instance, the media devices 106 can transmit present tuning or consumption data to the server 130 so that the server can identify various users that are consuming the same media content 125.

In one embodiment, the server 130 can obtain activity information 150 for various users (which include the group of users 101) that are consuming the same media content 125. The activity information 150 can be various types of data associated with the users. For example, the activity information 150 can be user preferences identified in user profiles of the various users. In another example, the activity information 150 can be membership in a social network (e.g., a social network website) managed by a social network server. In another example, the activity information 150 can be a history of communication service consumption, including media content previously presented, websites previously accessed, on-line purchasing history, off-line purchasing history, and so forth. In another example, the activity information 150 can be determined from membership in other groups, such as a bowling league, a volunteer group, a book club, and so forth. These memberships can be determined by the server 130 using various techniques, including analysis of user profiles that indicate the memberships, communications of the users indicating the memberships (e.g., an email renewal notice from a book club), purchasing history, and so forth.

In another example, the activity information 150 can be determined from electronic calendar information of the users, such as calendar reminders for a softball game which is indicative of the particular user being part of a softball league. The activity information 150 can be obtained directly from the users, such as responsive to requests for information, and/or can be obtained indirectly, such as through analysis of other data associated with the users (e.g., calendar information, purchasing history, media consumption history, and so forth). The monitoring or analysis of the use of services by the users and/or any other data associated with the users can be performed by the server 130 subject to authorization for the particular users. In one embodiment, the activity information can be a media consumption history 155 that is obtained from other devices 116 (e.g., a device of a particular user that is not presenting the media content 125) of the particular user(s).

The activity information 150 can be utilized by the server 130 for categorizing or otherwise assigning social categories among the various users. As an example, the activity information 150 can correlate activity information of a portion of the various users and assign a first social category associated with the group of users 101. For instance, the group of users 101 can be selected from among the various users (that are all viewing the same media content) based on a determination that all of the group of users 101 play in an adult sports league. In this example, the group of users 101 may or may not know each other. Further to this example, the adult sports league may be the same league or different leagues (including different types of leagues such as bowling and softball leagues). The first social category can be based on an already existing social network, such as membership in a social network website or membership in a travel club, and/or can be based on a generated social network, such as particular users that all go to dinner on Friday evening in the same local area or particular users that all regularly watch games of a particular team.

In one embodiment, the assigned social category can be utilized for determining a first common interest. For example, the common interest can a factor that was utilized in assigning the social category such as determining a common interest in playing softball which was utilized in assigning members to a social category of adult softball players. In another embodiment, the common interest can deduced or otherwise extrapolated from an assigned social category. For instance, the group of users 101 can be assigned to a social category of hunting based on correlated activity information that includes a media consumption history of outdoor sportsman television programs, subscriptions to outdoor sportsmen magazines and a purchasing history from outdoor sportsman stores. A determined common interest for the hunting social category can be classic cars or steak restaurants. This determination of the common interest among the hunting social category can be deduced according to information that is unrelated to the activity information 150 (e.g., statistical evidence gathered from study groups indicating that hunters tend to be interested in classic cars or steakhouse restaurants), information that is related to the activity information 150 (e.g., purchasing history of one, some or all of the users at classic car shows or steakhouse restaurants, or a combination of information that is related and unrelated to the activity information.

In one embodiment, a subset of the group of users 101 can be assigned to multiple social categories. For example, the group of users 101 including a first user 101A can be assigned to a first social category for hunting and the first user 101A can also be assigned to a second social category for playing adult softball according to activity information 150. In this example, a second user 101Z of the group of users 101 can be assigned to the first social group for hunting but is not assigned to the second social category for playing adult softball (according to activity information associated with the second user 101Z) and is not assigned to any other social category.

The server 130 can apply or otherwise determine a conflict resolution between the first and second social category assignments for the first user 101A. For example, the server 130 can determine whether the first user 101A has a stronger interest in the first or the second social category. In one embodiment, the server 130 can determine whether the first user 101A has a stronger interest in a first common interest associated with the first category or in a second common interest associated with the second social category, where the common interest for the social categories are determined as described above. The determining of a strength of interest can be performed utilizing carious techniques and analysis of various information. For instance, an amount or a frequency of engaging in activities associated with each of the social categories can be an indicator of a strength of interest, such as determining a stronger interest in hunting than in adult softball where first user 101A plays one softball game over a one year period but watches hunting programs daily. Other factors, such as amount of money spent on activities in the different social categories can also be analyzed. In one embodiment, user preferences, such as a user profile that indicates that the first user 101A has a stronger interest in hunting than in adult softball.

Once the conflict resolution is applied to user 101A, as well as to any other user that has been assigned to more than one social category, server 130 can select media services for members of the group where the media services are based on the assigned social category. For example, a first media service 175, which includes presenting additional content overlayed with the media content 125, can be selected by the server 130 according to the hunting social category, such as where the media content 125 is a hunting program and the additional content is a description of hunting gear presented during the media content. The first media service 175 can then be provided to any members of the group of users 101 that have not been assigned to multiple social categories but rather are only assigned to the hunting social category. For a subset of the group of users 101 that has been assigned to multiple social categories, such as user 101A that is assigned to both the hunting social category and the adult softball social category, the conflict resolution can be utilized for determining the media service that is to be provided to the particular user. For instance, if it is determined that the first user 101A plays in more than one adult softball league, is a volunteer softball coach, and has gone hunting only once in the past year then a conflict resolution determination can be made that the first user 101A has a stronger interest in the adult softball social category than in the hunting social category. In this example, a second media service 175, which includes presenting additional content that includes a live college softball game which is overlayed with the media content 125 (e.g., a picture-in-picture presentation), can be selected by the server 130 according to the adult softball social category. The second media service 175 can then be provided to any other members of the group of users 101 that have also been assigned to the adult softball social category and for which a conflict resolution has been applied to determine that the particular user has a strongest interest in the adult softball social category.

In one embodiment, the selection of the media service(s) to be provided to one, some or all of the group of users 101 can be according to various factors, including the type of media content 125, demographics associated with the group of users 101, network conditions, available network resources, subscriber agreements, and so forth.

In one embodiment, one or more media services can include an interface overlayed on the media content 125, where the interface enables particular users to communicate with each other during the presentation of the media content 125. For example, during presentation of a football game (i.e., the media content 125), the server 130 can assign all of the group of users 101 to a first social category for football fans. The server 130 can further assign a first subset of the group of users 101 to a second social category that is a fan club of team A which is playing in the football game. The server 130 can further assign a second subset of the group of users 101 to a third social category that is a fan club of player Smith that plays for team A, who is playing in the football game. In this example, three media services can be selected which are all interfaces for communication, such as a chat window that is overlayed in a corner of the display during the presenting of the football game. After conflict resolution to determine a stronger interest for particular users assigned to multiple social categories (e.g., a user that is assigned to the football category, assigned to the fan club of team A category, and is also assigned to the fan club of player Smith category), the different members of the group can be provided access to different chat windows (i.e., different media services). For instance, a user assigned to all three social categories but that has a strongest interest in player Smith (determined from the conflict resolution process described above) can be provided access to the chat window along with other users that have the same interest in player Smith, while another user that is assigned to only one category (i.e., the football fan category) can be provided access to a different chat window along with other users that have the same interest in football and not in team A or in player Smith. In this example, the media services are of a same type (e.g., chat windows), however, the media services can be of different types, such as the first media service 175 being an overlay display of other football scores (for the football fan social category) and the second media service 180 being a chat window (for the fan club of player Smith social category).

In one embodiment, the different media services 175, 180 can include targeted advertisements that are inserted into the media content 125 being presented. For example, the media content 125 can be broadcast content that includes a first advertisement. The first media service 175 can include replacing a first advertisement with a second advertisement during the presentation of media content 125 and the second media service 180 can include replacing the first advertisement with a third advertisement during the presentation of the media content 125. In this example, the second advertisement can be selected by the server 130 according to a first common interest that is determined for a first social category, and the third advertisement can be selected by the server 130 according to a second common interest that is determined for a second social category. In one embodiment, the different advertisements can be transmitted (e.g., via unicast or multicast) to the media devices 106 so that the media devices can insert the advertisements at insertion points in the media content 125.

In one embodiment, system 100 enables user definable ad-insertion, which allows customizable advertising content to be inserted into a video broadcast stream when a network is performing a video broadcast session for a particular group of social networking friends. For example, a network can automatically instantiate or perform a video broadcast session for multiple groups of social networking friends. The network can automatically instantiate or perform user definable ad-insertion for each group of social networking friends. For instance, the network can automatically detect, instantiate and/or retrieve particular interests for each group of social networking friends, including colleagues, family friends, college buddies, and so forth. In one embodiment, the user and/or the network can maintain a list of advertisements which match with particular interests for different social network groups. In one embodiment, the video broadcast would branch into multiple sessions wherein each session would allow for inserting an advertisement which represents a particular interest to that group of social networking. The interest(s) can be collected before the event or instantaneously on demand during the event. In one embodiment, the advertisement insertion can automatically adapt to network condition (e.g., congestion), such as adjusting from video advertisement to image advertisement or from audio advertisement to text advertisement. Other factors can be utilized for the advertisement insertion including time of day, location, emergency situations, and so forth.

Figure 2:
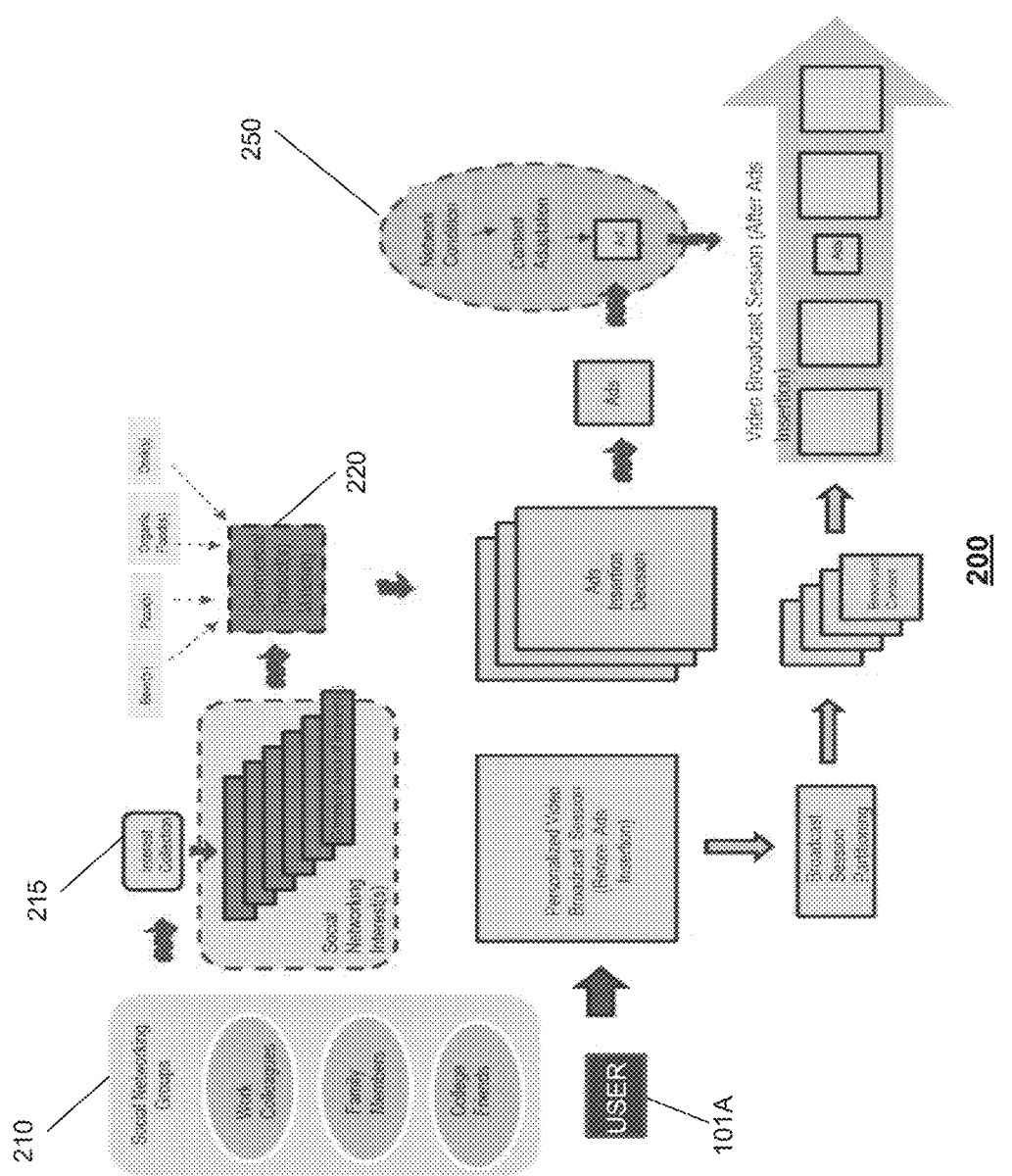

FIG. 2 depicts an illustrative embodiment of system 200 for dynamically categorizing users that are consuming media content and providing a media service (e.g., targeted advertisement insertion) for those particular users that have been commonly categorized. System 200 allows for categories 210 of social networking groups to be generated. For example, the categories 210 can be generated dynamically, such as responsive to determining users that are viewing a same media content. In another example, the categories 210 can be generated at various times and stored, such as storing an identification of members of a social category 210 of work colleagues and then later accessing the stored social category to determine if any work colleagues are viewing the same media content. In one embodiment, the social categories can be generated according to a relationship between the members of the social category which may or may not also be based on a correlation of common activities of the members. For example, a social category of work colleagues may be based only on working for the same employer, even where the members perform different jobs for the employer.

System 200 can apply an interest determination engine or device 215 to the various social categories 210 to determine common interests associated with the social categories. In one example, the determined common interest(s) can be directly related to the categorization of the social category, such as work colleagues that work at an auto-repair company being determined to have a common interest in auto mechanics or classic cars. In another example, the determined common interest(s) can be unrelated to the categorization of the social category, such as work colleagues that work at an auto-repair company being determined to have a common interest in scuba diving. In this example, the determination of the common interest can be according to activity information collected or otherwise accessed for the members of the social category, such as a media consumption history of scuba diving programs, a purchasing history of scuba diving equipment, and so forth. The common interest can be determined for some or all of the members of a particular social category.

System 200 can include an advertisement insertion engine or device 220 that can correlate common interests of a social category 210 with an advertisement for that common interest. For instance, the advertisement insertion engine 220 can determine products that some or all of the members of a social category would be interested according to the determined common interests of the users of the social category 210. Advertisements corresponding to those products can be selected and the corresponding advertisements can be inserted in the media content being presented to the members of the social category 110.

As an example, a plurality of users can be detected watching media content (e.g., a basketball game). System 200 enables determining that a group of users 101 (see FIG. 1) of the plurality of users are members of a particular social category 210 of work colleagues that work at an auto-repair company. The interest determination engine 215 can analyze various data (e.g., activity information for the group of users 101 and/or the relationship from which the social category in this example was assigned) to determine that all of the members of the group of users 101 have a common interest in auto mechanics, and to further determine that a subset of the members have a common interest in scuba diving. A determination can then be made for members of the subset as to whether a first advertisement associated with the common interest of auto mechanics is to be provided or a second advertisement associated with the common interest of scuba diving is to be provided. In this example, members of the group of users 101 that only have the common interest of auto mechanics (i.e., a remainder of the group outside of the subset) can be provided with the first advertisement. As explained herein, this determination as to which of the selected advertisements is to be provided can be based on a conflict resolution which determines for the particular user a stronger interest between the different common interests.

In one embodiment, a content adaptation engine or device 250 can access network condition data to determine network conditions, such as network traffic and congestion, available network resources, emergency situations associated with the network or associated with a particular geographical region, and so forth. Based on the network condition data, the content adaptation engine 250 can adjust the target advertisement(s). For example, a format of the target advertisement can be adjusted. In another example, a length of a target advertisement can be shortened.

Figure 3:
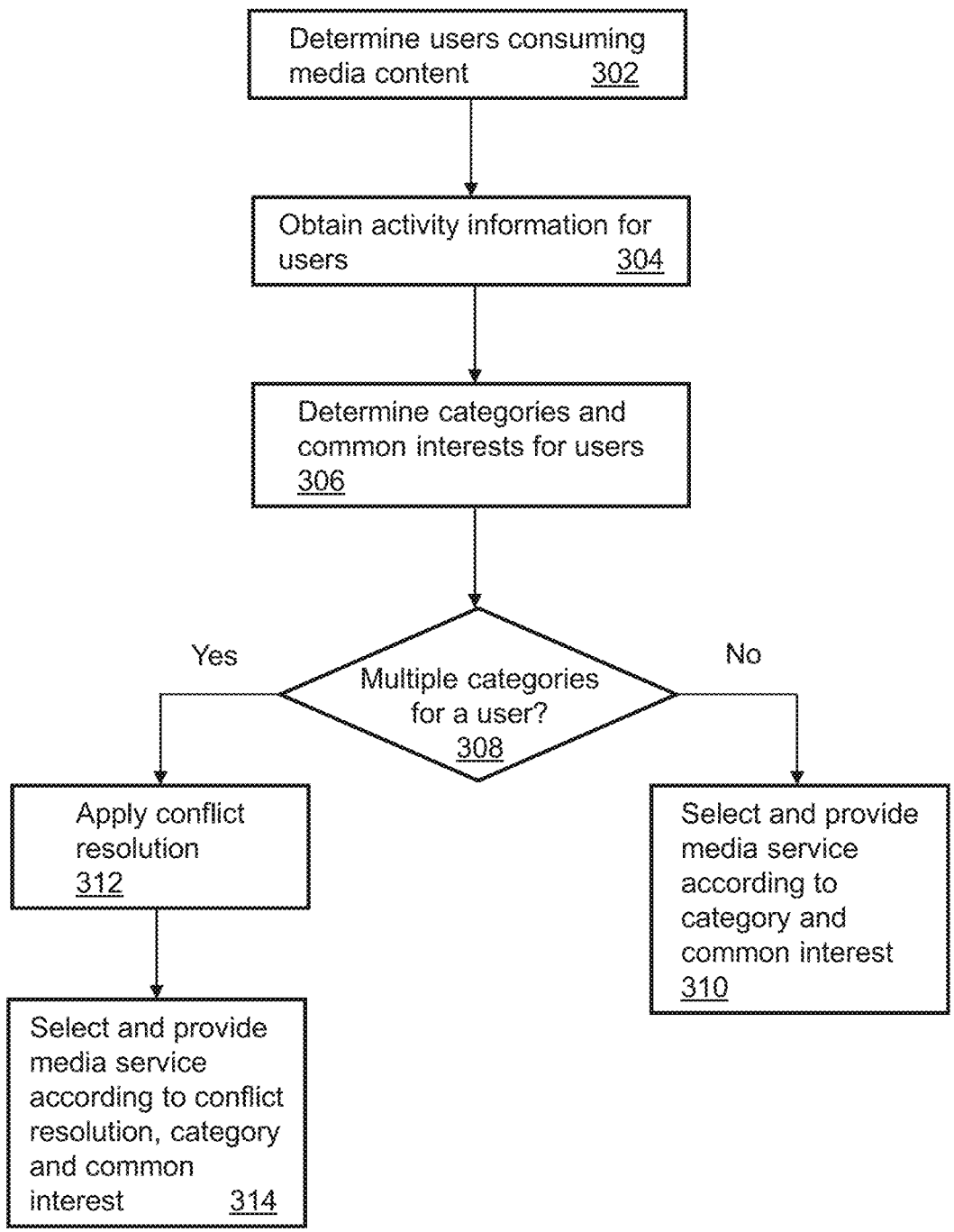
FIG. 3 depicts an illustrative embodiment of a method used in portions of the systems described in FIGS. 1 and/or 2.

FIG. 3 depicts an illustrative embodiment of a method 300 used by systems 100 and 200 for providing social categories to users and for providing different media services according to those social categories. Method 300 can begin at 302 where users consuming media content (e.g., a same media content) can be detected or otherwise determined. At 304, data can be collected or otherwise accessed to enable assigning or determining one or more social categories for all or some of the users. In one embodiment, activity information can be obtained for the users and a correlation of the activity information can be performed at 306 to determine a social category for at least some of the users thereby determining the group of users 101. The activity information can be various types of information including media consumption history, purchasing information, user profile preferences, electronic calendar information, group or club memberships, demographics, and so forth.

The activity information can also be utilized for determining a common interest among members of a particular social category. For example, correlation of activity information for the users can be utilized to assign a social category of travelers to the group of users 101. In this example, the activity information can include one or more of a consumption history of travel shows, a purchasing history of airline tickets and hotel lodging, ownership of time share units, demographics indicating the particular users are retired, and so forth. One or more of the members of the traveler social category may also have activity information indicative of reading books, such as a purchasing history of books, membership in a book club, and so forth. Based on this activity information as well as demographic information indicating that particular types of travelers may tend to read books more frequently than non-travelers, it can be determined that a common interest is reading books for the group of users 101 in the social category of traveler.

Method 300 can determine or otherwise assign any number of social categories for all or some of the users and for the group of users 101. Continuing with the above example, a subset of the group of users 101 in the social category of traveler may also be assigned to a social category of outdoor adventures where their activity information indicates taking part in hiking trips, watching outdoor shows, purchasing backpacking equipment, and so forth. Method 300 can also utilize other information for determining or otherwise assigning social categories, such as requesting user input from the users regarding their interests.

At 308, a determination can be made as to whether a particular user of the group of users 101 is assigned to only one social category, such as the traveler social category in the example described above. If only one social category has been assigned to the particular user then at 310 a media service can be selected and provided to user equipment of that particular user, such as according to the social category, a common interest determined for the social category, and/or the media content currently being consumed by the particular user. Other factors can also be considered in the selection of the media service to be provided to the particular user, including one or more of user preferences, feedback associated with past media services selected and provided to that particular user, network conditions for providing the media service, costs associated with the media service, subscriber agreements, quality of service requirements, and so forth. The media service can be provided in conjunction with the presentation of the media content. For example, if the media service is targeted advertising then it can be presented during an advertisement slot in the media content or it can be presented as an overlay on the media content, such as detecting a liquid being drunk during a movie and providing a text overlay stating that the liquid is a particular brand available from a particular store. In another example, the media service can be additional content that is to be provided in conjunction with the presentation of the media content, such as presenting more details describing a destination as an overlay during a travel show. Another media service that can be selected and provided is a communication interface, such as a chat window so that the group of users 101 (or a portion thereof) can communicate with each other during the presentation of the media content.

If on the other hand multiple social categories have been assigned to a particular user (of the group of users 101) then at 312 a conflict resolution process can be performed to determine which of the social categories should be utilized for the selection and providing of a media service to that particular user. The conflict resolution can include determining which of the multiple social categories that the particular user has a stronger interest in. The technique utilized for determining the stronger interest can vary. For example, an amount and/or frequency of first activity information corresponding to a first social category can be compared with an amount and/or frequency of second activity information corresponding to a second social category to determine a stronger interest in one of the first or second social categories. In another embodiment, weighting factors can be applied to various activity information corresponding to the different categories, and the weighted activity information can be utilized for determining a stronger interest in one of the multiple social categories.

After applying the conflict resolution, then at 314 a media service can be selected and provided to user equipment of that particular user, such as according to one of the social categories (selected according to a stronger interest to the particular user), a common interest determined for that social category, and/or the media content currently being consumed by that particular user.

In one embodiment, a media service can include an interface overlayed on the media content, where the interface enables end user communication during the consuming of the media content. In another embodiment, the determining of a social category associated with the group of users 101 can include obtaining, by the system, the activity information for a plurality of users that are consuming the media content, where the plurality of users includes the group of users; determining, by the system, a group of activities according to the activity information; and determining, by the system, a common activity according to a correlation associated with the group of activities, wherein the group of users is associated with the common activity. In another embodiment, the activity information is obtained from user preferences identified in user profiles of a plurality of users that are consuming the media content.

In one embodiment, a media service can include access to additional content that is overlayed on the media content, where the additional content is associated with a common interest determined for a particular social category. In one embodiment, a first media service can include replacing a first advertisement with a second advertisement during the consuming of the media content, where a second media service comprises replacing the first advertisement with a third advertisement during the consuming of the media content, where the second advertisement is selected according to a first common interest of a first assigned social category, and where the third advertisement is selected according to a second common interest of a second assigned social category.

In one embodiment, multiple media services can be provided. For example, a first portion of the group of users (e.g., a subset of the group) can receive a first media service of a chat window and a second media service of targeted advertising, while a second portion of the group of users (e.g., a remainder of the group) can receive a third media service of a different chat window and a fourth media service of different targeted advertising. In this example, all four of these media services can be provided in conjunction with the presentation of the media service.

While for purposes of simplicity of explanation, the respective processes are shown and described as a series of blocks in FIG. 3, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 4:
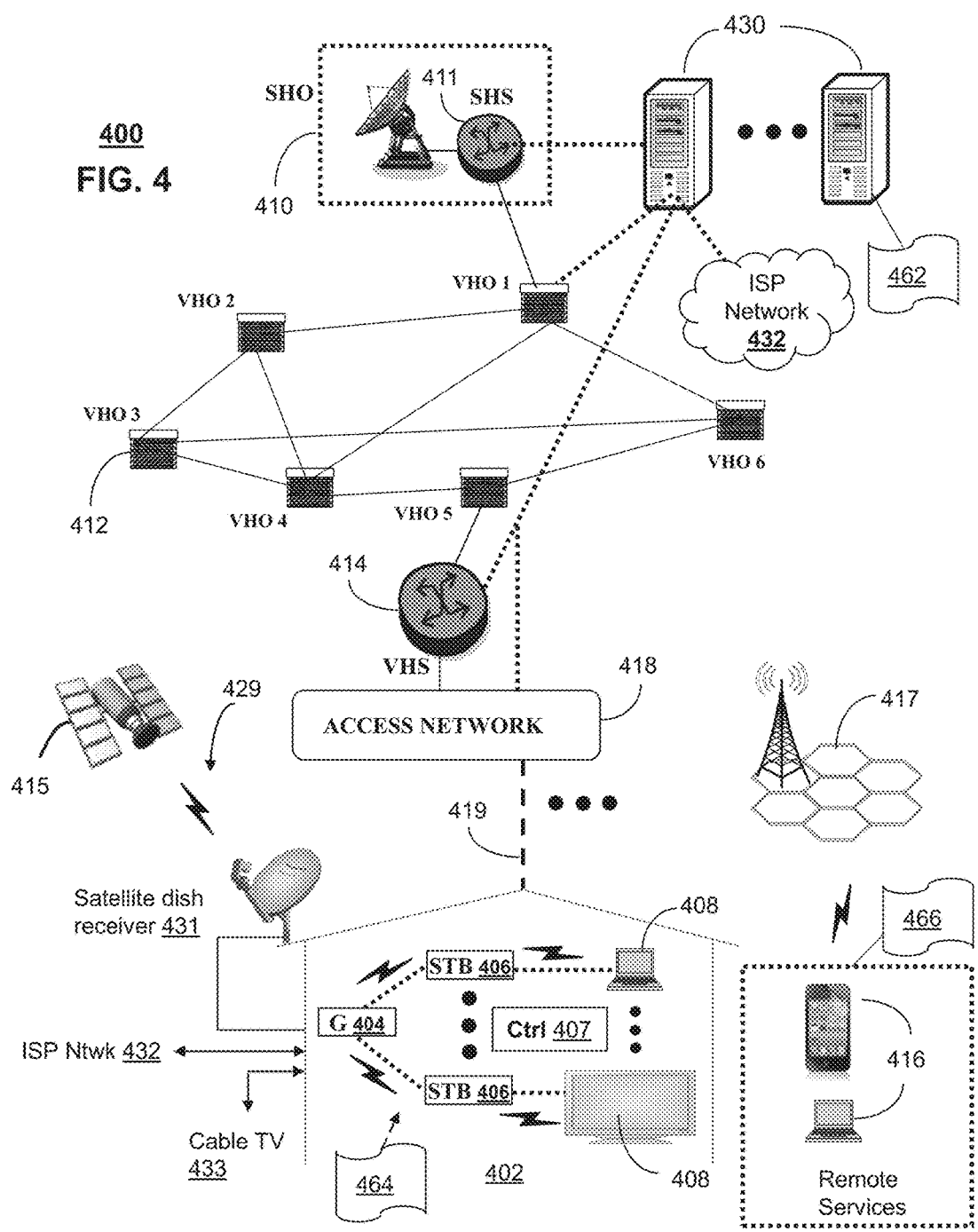
FIG. 4 depict an illustrative embodiment of a communication system that provides media services including categorizing users and providing media services to those users according to common interests.

FIG. 4 depicts an illustrative embodiment of a first communication system 400 for delivering media content. The communication system 400 can represent an interactive television system, such as an Internet Protocol Television (IPTV) media system. Communication system 400 can be overlaid or operably coupled with systems 100 and/or 200 as another representative embodiment of communication system 400. For instance, one or more devices illustrated in the communication system 400 of FIG. 4 can determine a first common interest associated with a group of users according to activity information obtained for the group of users where the group of users are at different locations and are consuming media content that is a same media content, determine a second common interest associated with a subset of the group of users according to the activity information where the second common interest is not associated with a remainder of the group of users, provide a first media service during the consuming of the media content to first equipment of the remainder of the group of users where the first media service is selected according to the first common interest, and/or provide one of the first media service or a second media service during the consuming of the media content to second equipment of the subset of the group of users according to a conflict resolution, where the second media service is selected according to the second common interest, and where the conflict resolution is based on determining a stronger interest, between the first and second common interests, that is associated with each member of the subset of the group of users.

The IPTV media system can include a super head-end office (SHO) 410 with at least one super headend office server (SHS) 411 which receives media content from satellite and/or terrestrial communication systems. In the present context, media content can represent, for example, audio content, moving image content such as 2D or 3D videos, video games, virtual reality content, still image content, and combinations thereof. The SHS server 411 can forward packets associated with the media content to one or more video head-end servers (VHS) 414 via a network of video head-end offices (VHO) 412 according to a multicast communication protocol.

The VHS 414 can distribute multimedia broadcast content via an access network 418 to commercial and/or residential buildings 402 housing a gateway 404 (such as a residential or commercial gateway). The access network 418 can represent a group of digital subscriber line access multiplexers (DSLAMs) located in a central office or a service area interface that provide broadband services over fiber optical links or copper twisted pairs 419 to buildings 402. The gateway 404 can use communication technology to distribute broadcast signals to media processors 406 such as Set-Top Boxes (STBs) which in turn present broadcast channels to media devices 408 such as computers or television sets managed in some instances by a media controller 407 (such as an infrared or RF remote controller).

The gateway 404, the media processors 406, and media devices 408 can utilize tethered communication technologies (such as coaxial, powerline or phone line wiring) or can operate over a wireless access protocol such as Wireless Fidelity (WiFi), Bluetooth®, Zigbee®, or other present or next generation local or personal area wireless network technologies. By way of these interfaces, unicast communications can also be invoked between the media processors 406 and subsystems of the IPTV media system for services such as video-on-demand (VoD), browsing an electronic programming guide (EPG), or other infrastructure services.

A satellite broadcast television system 429 can be used in the media system of FIG. 4. The satellite broadcast television system can be overlaid, operably coupled with, or replace the IPTV system as another representative embodiment of communication system 400. In this embodiment, signals transmitted by a satellite 415 that include media content can be received by a satellite dish receiver 431 coupled to the building 402. Modulated signals received by the satellite dish receiver 431 can be transferred to the media processors 406 for demodulating, decoding, encoding, and/or distributing broadcast channels to the media devices 408. The media processors 406 can be equipped with a broadband port to an Internet Service Provider (ISP) network 432 to enable interactive services such as VoD and EPG as described above.

In yet another embodiment, an analog or digital cable broadcast distribution system such as cable TV system 433 can be overlaid, operably coupled with, or replace the IPTV system and/or the satellite TV system as another representative embodiment of communication system 400. In this embodiment, the cable TV system 433 can also provide Internet, telephony, and interactive media services. System 400 enables various types of interactive television and/or services including IPTV, cable and/or satellite.

The subject disclosure can apply to other present or next generation over-the-air and/or landline media content services system.

Some of the network elements of the IPTV media system can be coupled to one or more computing devices 430, a portion of which can operate as a web server for providing web portal services over the ISP network 432 to wireline media devices 408 or wireless communication devices 416.

Communication system 400 can also provide for all or a portion of the computing devices 430 to function as a categorization and media service selection server (herein referred to as server 430). The server 430 can use computing and communication technology to perform function 462, which can include among other things, obtaining activity information for each of a group of users at different locations consuming media content that is a same media content; determining a first social category associated with the group of users according to the activity information; determining a first common interest associated with the first social category; determining a second social category associated with a subset of the group of users according to the activity information, where the second social category is not associated with a remainder of the group of users; determining a second common interest associated with the second social category; providing a first media service during the consuming of the media content to first equipment of the remainder of the group of users, where the first media service is selected according to the first common interest and according to the media content being consumed; determining a conflict resolution by determining a stronger interest, between the first and second common interests, that is associated with each member of the subset of the group of users; and/or providing one of the first media service or a second media service during the consuming of the media content to second equipment of the subset of the group of users according to the conflict resolution, wherein the second media service is selected according to the second common interest and according to the media content being consumed. For instance, function 462 of server 430 can be similar to the functions described for server 130 of FIG. 1, devices 215, 220, and/or 250 of FIG. 2, and/or in accordance with method 300.

The media processors 406 and wireless communication devices 416 can be provisioned with software function 464 to utilize the services of server 430. Function 464, can include among other things, receiving, from a system including a server, media content; presenting the media content at a display device associated with a user; receiving, from the system, a targeted advertisement that has been selected by the system from among a group of advertisements according to: a first common interest of a first social category assigned by the system to a group of users including the user that are consuming the media content, a second common interest of a second social category assigned by the system to a subset of the group of users that includes the user and that is not associated with a remainder of the group of users, and a conflict resolution applied by the system by determining a stronger interest of the user between the first and second common interests; detecting an insertion point in the media content; and/or presenting the targeted advertisement at the insertion point.

Function 464 can include providing activity information to the system, where the first and second social categories are assigned to the user according to the activity information. In one embodiment, the activity information includes a media consumption history associated with the user. Function 464 can include collecting a portion of the activity information from another device of the user according to a media consumption history at the other device. In one embodiment, the first and second social categories are assigned to the user according to activity information associated with the user, and/or the activity information is based on user preferences described in a user profile of the user that is accessible to the system. In one embodiment, the receiving of media content is via a broadcast, and/or the receiving of the targeted advertisement is via a multicast to equipment of the remainder of the group of users. For instance, function 464 of media processors 406 and wireless communication devices 416 can be similar to the functions described for the devices 106, 116 of FIG. 1 in accordance with method 300.

Multiple forms of media services can be offered to media devices over landline technologies such as those described above. Additionally, media services can be offered to media devices by way of a wireless access base station 417 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 5:
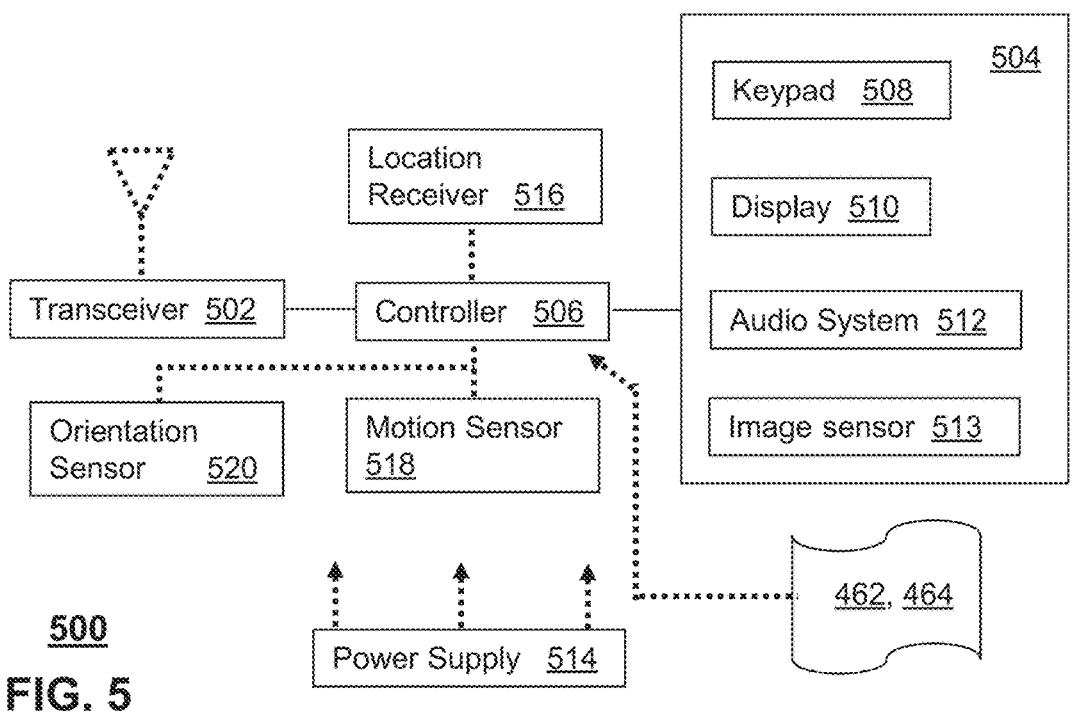
FIG. 5 depicts an illustrative embodiment of a communication device that can be utilized in a system which categorizes users and provides media services to those users according to common interests.

FIG. 5 depicts an illustrative embodiment of a communication device 500. Communication device 500 can serve in whole or in part as an illustrative embodiment of the devices depicted in FIGS. 1, 2 and/or 4 and can be configured to perform portions of method 300 of FIG. 3. As an example, communication device 500 can determine a first common interest associated with a group of users according to activity information obtained for the group of users consuming the same or different media content; determine a second common interest associated with a subset of the group of users according to the activity information where the second common interest is not associated with a remainder of the group of users; provide a first media service during the consuming of the media content to first equipment of the remainder of the group of users where the first media service is selected according to the first common interest; and/or provide one of the first media service or a second media service during the consuming of the media content to second equipment of the subset of the group of users according to a conflict resolution, where the second media service is selected according to the second common interest, and where the conflict resolution is based on determining a stronger interest, between the first and second common interests, that is associated with each member of the subset of the group of users.

Communication device 500 can comprise a wireline and/or wireless transceiver 502 (herein transceiver 502), a user interface (UI) 504, a power supply 514, a location receiver 516, a motion sensor 518, an orientation sensor 520, and a controller 506 for managing operations thereof. The transceiver 502 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 502 can also be adapted to support circuit-switched wireline access technologies (such as PSTN), packet-switched wireline access technologies (such as TCP/IP, VoIP, etc.), and combinations thereof.

The UI 504 can include a depressible or touch-sensitive keypad 508 with a navigation mechanism such as a roller ball, a joystick, a mouse, or a navigation disk for manipulating operations of the communication device 500. The keypad 508 can be an integral part of a housing assembly of the communication device 500 or an independent device operably coupled thereto by a tethered wireline interface (such as a USB cable) or a wireless interface supporting for example Bluetooth®. The keypad 508 can represent a numeric keypad commonly used by phones, and/or a QWERTY keypad with alphanumeric keys. The UI 504 can further include a display 510 such as monochrome or color LCD (Liquid Crystal Display), OLED (Organic Light Emitting Diode) or other suitable display technology for conveying images to an end user of the communication device 500. In an embodiment where the display 510 is touch-sensitive, a portion or all of the keypad 508 can be presented by way of the display 510 with navigation features.

The display 510 can use touch screen technology to also serve as a user interface for detecting user input. As a touch screen display, the communication device 500 can be adapted to present a user interface with graphical user interface (GUI) elements that can be selected by a user with a touch of a finger. The touch screen display 510 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 510 can be an integral part of the housing assembly of the communication device 500 or an independent device communicatively coupled thereto by a tethered wireline interface (such as a cable) or a wireless interface.

The UI 504 can also include an audio system 512 that utilizes audio technology for conveying low volume audio (such as audio heard in proximity of a human ear) and high volume audio (such as speakerphone for hands free operation). The audio system 512 can further include a microphone for receiving audible signals of an end user. The audio system 512 can also be used for voice recognition applications. The UI 504 can further include an image sensor 513 such as a charged coupled device (CCD) camera for capturing still or moving images.

The power supply 514 can utilize common power management technologies such as replaceable and rechargeable batteries, supply regulation technologies, and/or charging system technologies for supplying energy to the components of the communication device 500 to facilitate long-range or short-range portable applications. Alternatively, or in combination, the charging system can utilize external power sources such as DC power supplied over a physical interface such as a USB port or other suitable tethering technologies.

The location receiver 516 can utilize location technology such as a global positioning system (GPS) receiver capable of assisted GPS for identifying a location of the communication device 500 based on signals generated by a constellation of GPS satellites, which can be used for facilitating location services such as navigation. The motion sensor 518 can utilize motion sensing technology such as an accelerometer, a gyroscope, or other suitable motion sensing technology to detect motion of the communication device 500 in three-dimensional space. The orientation sensor 520 can utilize orientation sensing technology such as a magnetometer to detect the orientation of the communication device 500 (north, south, west, and east, as well as combined orientations in degrees, minutes, or other suitable orientation metrics).

The communication device 500 can use the transceiver 502 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 506 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 500.

Other components not shown in FIG. 5 can be used in one or more embodiments of the subject disclosure. For instance, the communication device 500 can include a reset button (not shown). The reset button can be used to reset the controller 506 of the communication device 500. In yet another embodiment, the communication device 500 can also include a factory default setting button positioned, for example, below a small hole in a housing assembly of the communication device 500 to force the communication device 500 to re-establish factory settings. In this embodiment, a user can use a protruding object such as a pen or paper clip tip to reach into the hole and depress the default setting button. The communication device 500 can also include a slot for adding or removing an identity module such as a Subscriber Identity Module (SIM) card. SIM cards can be used for identifying subscriber services, executing programs, storing subscriber data, and so forth.

The communication device 500 as described herein can operate with more or less of the circuit components shown in FIG. 5. These variant embodiments can be used in one or more embodiments of the subject disclosure.

The communication device 500 can be adapted to perform the functions of devices 106, 116 and/or server 130 of FIG. 1, and/or the media processor 406, the media devices 408, the portable communication devices 416 and/or the server 430 of FIG. 4. It will be appreciated that the communication device 500 can also represent other devices that can operate in systems 100, 200 of FIGS. 1 and 2], and/or communication system 400 of FIG. 4, such as a gaming console and a media player. In addition, the controller 506 can be adapted in various embodiments to perform the functions 462 and 464.

Upon reviewing the aforementioned embodiments, it would be evident to an artisan with ordinary skill in the art that said embodiments can be modified, reduced, or enhanced without departing from the scope of the claims described below. For example, the detection of the group of users 101 can be based on each of the users consuming media content which may not be the same media content, such as different users being tuned to different television channels. In one embodiment, the providing of targeted advertisements can be performed at different times for different users. For example, media processors of different users watching different television channels may receive the same or different targeted advertisement (e.g., according to the determination of common interest(s) and/or the assignment of social category(ies) as described with respect to method 300) at different times. In this example, the media processor can store the targeted advertisement until the advertisement insertion point is detected. In another embodiment, the advertisement inserted may be performed by the network server. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 6:
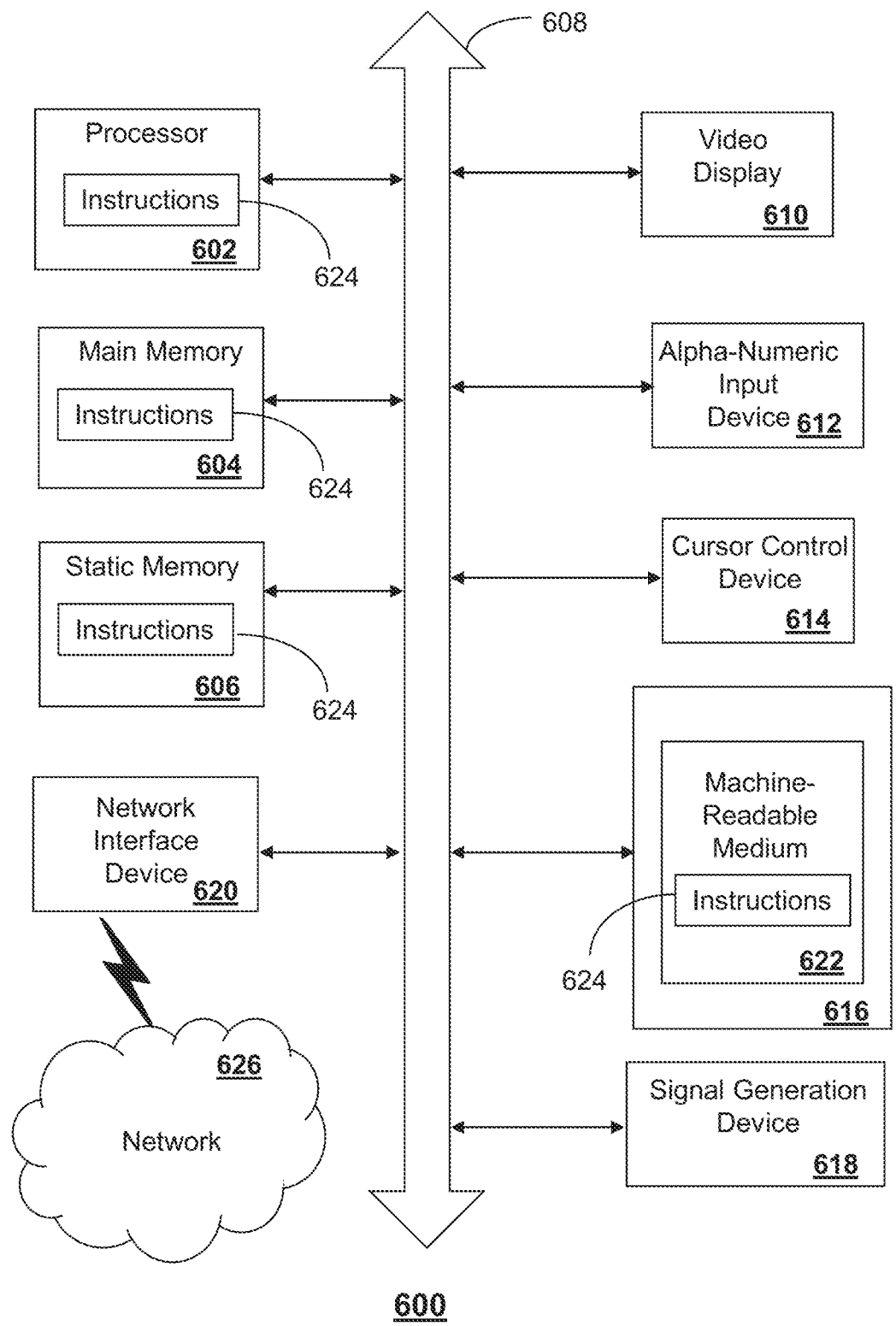
FIG. 6 is a diagrammatic representation of a machine in the form of a computer system within which a set of instructions, when executed, may cause the machine to perform any one or more of the methods described herein.

FIG. 6 depicts an exemplary diagrammatic representation of a machine in the form of a computer system 600 within which a set of instructions, when executed, may cause the machine to perform any one or more of the methods described above.

System 600 enables socially categorizing different users and providing services according to those categories. The different users can be consuming a same or different content and different services and/or content can be provided (e.g., in addition to the presentation of the content) based on social network group(s) that are assigned to the different users. One or more instances of the machine can operate, for example, as one or more of the devices 106, 116, the server 130, 430, the devices 406, 416 and other devices of FIGS. 1-2 and 4-5.] In some embodiments, the machine may be connected (e.g., using a network 626) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine.

It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 600 may include a processor (or controller) 602 (e.g., a central processing unit (CPU)), a graphics processing unit (GPU, or both), a main memory 604 and a static memory 606, which communicate with each other via a bus 608. The computer system 600 may further include a display unit 610 (e.g., a liquid crystal display (LCD), a flat panel, or a solid state display). The computer system 600 may include an input device 612 (e.g., a keyboard), a cursor control device 614 (e.g., a mouse), a disk drive unit 616, a signal generation device 618 (e.g., a speaker or remote control) and a network interface device 620. In distributed environments, the embodiments described in the subject disclosure can be adapted to utilize multiple display units 610 controlled by two or more computer systems 600. In this configuration, presentations described by the subject disclosure may in part be shown in a first of the display units 610, while the remaining portion is presented in a second of the display units 610.

The disk drive unit 616 may include a tangible computer-readable storage medium 622 on which is stored one or more sets of instructions (e.g., software 624) embodying any one or more of the methods or functions described herein, including those methods illustrated above. The instructions 624 may also reside, completely or at least partially, within the main memory 604, the static memory 606, and/or within the processor 602 during execution thereof by the computer system 600. The main memory 604 and the processor 602 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 622 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 600.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
    obtaining, by a system including a processor, activity information for each of a group of users at different locations consuming media content;
    determining, by the system, a first social category associated with the group of users according to the activity information;
    determining, by the system, a first common interest associated with the first social category;
    determining, by the system, a second social category associated with a subset of the group of users according to the activity information, wherein the second social category is not associated with a remainder of the group of users;
    determining, by the system, a second common interest associated with the second social category;
    providing, by the system, a first media service during the consuming of the media content to first equipment of the remainder of the group of users, wherein the first media service is selected according to the first common interest and according to the media content being consumed;
    determining, by the system, a conflict resolution by determining a stronger interest, between the first and second common interests, that is associated with each member of the subset of the group of users; and
    providing, by the system, one of the first media service or a second media service during the consuming of the media content to second equipment of the subset of the group of users according to the conflict resolution resulting in a provided media service, wherein the provided media service includes presenting the media content and a chat window on a display of the second equipment, wherein the chat window presents user-generated input from one of the group of users.

2. The method of claim 1, wherein the media content being consumed is a same media content, wherein the first media service comprises an interface overlayed on the media content, and wherein the interface enables end user communication during the consuming of the media content.

3. The method of claim 2, wherein the determining of the first social category associated with the group of users comprises:
    obtaining, by the system, the activity information for a plurality of users that are consuming the media content, where the plurality of users includes the group of users;
    determining, by the system, a group of activities according to the activity information; and
    determining, by the system, a common activity according to a correlation associated with the group of activities, wherein the group of users is associated with the common activity.

4. The method of claim 3, wherein the activity information is obtained from user preferences identified in user profiles of the plurality of users.

5. The method of claim 1, wherein the first media service comprises access to additional content that is overlayed on the media content, and wherein the additional content is associated with the first common interest.

6. The method of claim 1, wherein the first media service comprises replacing a first advertisement with a second advertisement during the consuming of the media content, wherein the second media service comprises replacing the first advertisement with a third advertisement during the consuming of the media content, wherein the second advertisement is selected according to the first common interest, and wherein the third advertisement is selected according to the second common interest.

7. The method of claim 1, wherein the activity information includes membership in a social network managed by a social network server.

8. The method of claim 1, wherein the determining of the stronger interest, between the first and second common interests, is based on a history of media consumption.

9. A non-transitory machine-readable storage medium, comprising executable instructions that, when executed by a processor, facilitate performance of operations, comprising:
   determining a first common interest associated with a group of users according to activity information obtained for the group of users, wherein the group of users are at different locations and are consuming media content;
   determining a second common interest associated with a subset of the group of users according to the activity information, wherein the second common interest is not associated with a remainder of the group of users;
   providing a first media service during the consuming of the media content to first equipment of the remainder of the group of users, wherein the first media service is selected according to the first common interest; and
   providing one of the first media service or a second media service during the consuming of the media content to second equipment of the subset of the group of users according to a conflict resolution resulting in a provided media service, and wherein the conflict resolution is based on determining a stronger interest, between the first and second common interests, that is associated with each member of the subset of the group of users, wherein the provided media service includes presenting the media content and a chat window on a display of the second equipment, wherein the chat window presents user-generated input from one of the group of users.

10. The non-transitory machine-readable storage medium of claim 9, wherein the first and second media services are selected according to the media content being consumed, and wherein the media content being consumed is a same media content.

11. The non-transitory machine-readable storage medium of claim 9, wherein the first media service comprises access to first additional content that is overlayed on the media content, wherein the first additional content is associated with the first common interest, wherein the second media service comprises access to second additional content that is overlayed on the media content, and wherein the second additional content is associated with the second common interest.

12. The non-transitory machine-readable storage medium of claim 9, wherein the first media service comprises an interface overlayed on the media content, and wherein the interface enables end user communication during the consuming of the media content.

13. The non-transitory machine-readable storage medium of claim 9, wherein the first media service comprises replacing a first advertisement with a second advertisement during the consuming of the media content, wherein the second media service comprises replacing the first advertisement with a third advertisement during the consuming of the media content, wherein the second advertisement is selected according to the first common interest, and wherein the third advertisement is selected according to the second common interest.

14. The non-transitory machine-readable storage medium of claim 9, wherein the activity information includes membership in a social network managed by a social network server.

15. A device, comprising:
   a processor; and
   a memory that stores executable instructions that, when executed by the processor, facilitate performance of operations, comprising:
   receiving, from a system including a server, media content;
   presenting the media content at a display device associated with a user;
   receiving, from the system, a targeted advertisement that has been selected by the system from among a group of advertisements according to:
      a first common interest of a first social category assigned by the system to a group of users including the user that are consuming the media content,
      a second common interest of a second social category assigned by the system to a subset of the group of users that includes the user and that is not associated with a remainder of the group of users, and
      a conflict resolution applied by the system by determining a stronger interest of the user between the first and second common interests; and
   detecting an insertion point in the media content; and
   presenting the targeted advertisement at the insertion point, wherein presenting the media content includes presenting a chat window on the display device, wherein the chat window presents user-generated input from one of the group of users.

16. The device of claim 15, wherein the operations further comprise providing activity information to the system, wherein the first and second social categories are assigned to the user according to the activity information.

17. The device of claim 16, wherein the activity information includes a media consumption history associated with the user.

18. The device of claim 16, wherein the operations further comprise collecting a portion of the activity information from another device of the user according to a media consumption history at the other device.

19. The device of claim 15, wherein the first and second social categories are assigned to the user according to activity information associated with the user, and wherein the activity information is based on user preferences described in a user profile of the user that is accessible to the system.

20. The device of claim 15, wherein the receiving of media content is via a broadcast, and wherein the receiving of the targeted advertisement is via a multicast to equipment of the remainder of the group of users.

* * * * *